April 6, 1954  B. J. PIQUÉ  2,674,094
ROTARY, TOROIDAL CHAMBER-TYPE HYDRAULIC COUPLING
Filed Oct. 24, 1952
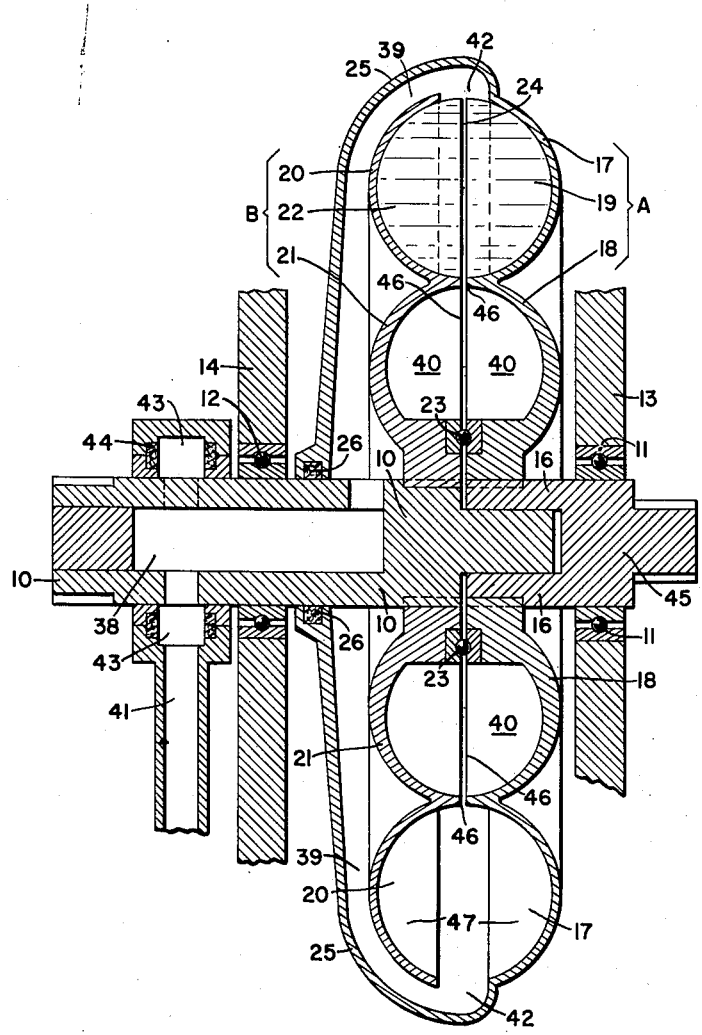
INVENTOR Patented Apr. 6, 1954

2,674,094

UNITED STATES PATENT OFFICE 2,674,094

ROTARY, TOROIDAL CHAMBER-TYPE HYDRAULIC COUPLING

Baudilio Jesús Piqué, Ampliacion de Almendares, Marianao Township, Cuba

Application October 24, 1952, Serial No. 316,629

2 Claims. (Cl. 60—54)

My invention relates to improvements in sealed fluid coupling or sealed hydraulic clutch in which a simplified mechanism is attained by means of improved arrangements and combination of parts adapted to fulfill a double function by a simple injection of the coupling liquid and hence its exhaustion, thus controlling the slippage and regulating the coupling in the fluid work chamber.

This sealed fluid coupling has been designed for use with the hydrodynamic transmission disclosed in my co-pending application Serial No. 191,431 filed October 21, 1950, now Patent No. 2,628,509 issued on February 17, 1953, but it should be understood that the invention is of general application.

It is known that in fluid coupling apparatus, of the general organization called for whereby liquid is added to and extracted from the work chamber, there are air passages adapted to inject air or gas by pressure to regulate the amount of liquid in the fluid work chamber. With my improvements I have attained a simplified mechanism by means of improved arrangements and combination of parts designed to utilize the compressibility principles of any gaseous fluid and its expansive force to regulate the pressure conditions in controlling the amount of coupling liquid in the fluid work chamber of my sealed fluid coupling device.

The objects of my invention are: first, to provide means to simplify the mechanism in a sealed fluid coupling; second, to afford facilities for the proper adjustment of filling of the fluid work chamber and thus controlling the slippage in a sealed fluid coupling; third, a further object is the adaptation of a sealed fluid coupling comprising a series of rotary chambers and passages arranged in serial intercommunication being previously filled with air or any gas to be compressed and forced into an air chamber when the coupling liquid is injected by pressure to fill the fluid work chamber and thus the expansive force of said compressed air or gas will tend to empty the liquid from the work chamber and will regulate the pressure conditions in controlling the amount of coupling liquid in said work chamber.

Referring to the drawing, the sole figure represents a longitudinal sectional view through a sealed fluid coupling device comprising my improvements.

A driving shaft 45 being rotatably supported by bearing means 11 in a stationary supporting means 13, and a driven shaft 10 being rotatably supported by bearing means 12 in a stationary supporting means 14. The inner end 16 of the driving shaft 45 has fixed thereto a radially extending hub member 18 of the impeller rotor and the inner end of the driven shaft 10 has fixed thereto a radially extending hub member 21 of the turbine rotor, the two shafts 45 and 10 being coaxially arranged in end to end abutting relationship. A bearing member 23 is positioned between the two adjacent hub members 18 and 21.

The impeller hub member 18 has a radially extending semi-toroidal impeller shell 17 fixed to its periphery and the turbine hub member 21 has a similar but oppositely facing semi-toroidal turbine shell 20 fixed to its periphery, the two shells 17 and 20 being axially positioned in face to face relationship to form the toroidal work chamber 47 of the fluid coupling. Each of these shells 17 and 20 is equipped with radially extending blades, the impeller blades being designated by the numeral 19 and the turbine blades by the numeral 22. The impeller rotor is designated in its entirety by the letter A and the turbine rotor by the letter B.

The hub members 18 and 21 are bulged in the opposite sense to form a toroidal air chamber 40 positioned concentrically within the toroidal work chamber 47. The impeller blades 19 and turbine blades 22 have a working clearance as shown at 24. The outer peripheries of the hub members 18 and 21 are spaced as at 46 to provide a narrow annular passage between air chamber 40 and the work chamber 47.

A casing member 25 is attached to the outer periphery of the impeller shell 17 and extends radially inward in spaced relationship with the turbine shell 20 to form a seal, as at 26, with the driven shaft 10, thus forming an auxiliary fluid chamber 39 which extends between said casing member 25 and the turbine rotor B, from the driven shaft 10 to a wide annular opening 42 between the outer peripheries of the two shells 17 and 20. Driven shaft 10 is bored, as at 38, to provide a fluid passage which communicates at one end with said auxiliary chamber 39 and at the other end with liquid supply and exhaust passages 43 and 41, the passage 43 being formed by a gland surrounding driven shaft 10 which is sealed with respect thereto by sealing means 44. The liquid supply and exhaust passage 41 is a stationary conduit to be connected at the outer end with a liquid source not shown in the drawing to supply liquid under pressure to said conduit 41.

The several rotary chambers of this sealed fluid coupling are previously filled with air or preferably filled with appropriate gas. The narrow annular passage 46 permits passage of air or gas more easily than liquids and separates the air or gas from the work chamber 47. The wide annular opening 42 between the peripheries of impeller and turbine shells 17 and 20 favors a quick emptying of the fluid work chamber 47.

Said arrangement and combination of parts being thus adapted to fulfill a double function by a simple injection of coupling liquid to fill the toroidal work chamber 47 whereby the air or gas previously contained in this fluid coupling will be compressed and forced into the toroidal air chamber 40 to cooperate by its expansive force in said double function regulating the pressure conditions in controlling the amount of coupling liquid in said fluid work chamber 47.

From the above description of the device it can be readily seen that when liquid under pressure is admitted to conduit 41 it will fill the auxiliary chamber 39 and the work chamber 47, by way of wide annular opening 42, compressing the air or gas contained in these chambers 39 and 47 which will be forced through the narrow annular passage 46 into the air chamber 40. On the other hand, when it is desired to empty the work chamber 47, suction can be applied to conduit 41 to overcome the centrifugal force of the liquid in the auxiliary chamber 39, whereby centrifugal force of the liquid in the work chamber 47 in conjunction with the expansive force of the compressed air or gas in air chamber 40 will tend to empty the liquid from the work chamber 47 through wide opening 42. It is therefore apparent that the extent of filling of the work chamber 47 and thus the slippage in the coupling can be regulated by changing the pressure conditions in feed conduit 41.

I claim:

1. In a sealed fluid coupling having an impeller rotor and a turbine rotor both positioned coaxially in face to face relationship, a series of rotary chambers and passages arranged in serial intercommunication comprising a liquid supply and exhaust passage, a rotary auxiliary chamber located coaxial with said turbine rotor by closing means and connecting with said liquid supply and exhaust passage, a rotary toroidal work chamber formed between the peripheries of said impeller and turbine rotors, a wide annular opening between the outer peripheries of said impeller and turbine rotors communicating said toroidal work chamber with said auxiliary chamber, a rotary toroidal air chamber positioned concentrically within said rotary toroidal work chamber, a narrow annular passage communicating said rotary toroidal work chamber with said rotary toroidal air chamber, said rotary toroidal work chamber being equipped with radially extending impeller and turbine blades, said several rotary chambers being previously filled with air or any gaseous fluid to be compressed and forced through said narrow annular passage into said rotary toroidal air chamber when coupling liquid under pressure is admitted through said liquid supply and exhaust passage to fill said auxiliary chamber and said toroidal work chamber whereby the compressibility principle of gaseous fluid and its expansive force is adapted to regulate the pressure conditions in controlling the amount of coupling liquid in said rotary toroidal work chamber.

2. A sealed fluid coupling comprising an impeller rotor and a turbine rotor both being designed and positioned coaxially in face to face relationship forming a toroidal work chamber and a toroidal air chamber, said toroidal air chamber being positioned concentrically within said toroidal work chamber, a narrow annular passage communicating said toroidal work chamber with said toroidal air chamber, a casing member attached to the outer periphery of said impeller rotor and extending radially inward in spaced relationship with said turbine rotor and closing said fluid coupling by sealing means, an auxiliary chamber which extends between said casing member and said turbine rotor, a wide annular opening between the outer peripheries of said impeller and turbine rotors communicating said toroidal work chamber with said auxiliary chamber, said toroidal work chamber being equipped with radially extending impeller and turbine blades, said mentioned chambers being previously filled with air or any appropriate gas, and a liquid supply and exhaust conduit communicating by means of fluid passages with said auxiliary chamber, said arrangement and combination of parts being thus adapted to fulfill a double function by a simple injection of coupling liquid admitted under pressure through said liquid supply and exhaust conduit to fill said auxiliary chamber and said toroidal work chamber whereby the air or gas contained in said chambers will be compressed and forced through said narrow annular passage into said toroidal air chamber to cooperate by its expansive force in said double function regulating the pressure conditions in controlling the amount of coupling liquid in said toroidal work chamber.

References Cited in the file of this patent

UNITED STATES PATENTS

| Number | Name | Date |
|---|---|---|
| 1,881,082 | Kiep | Oct. 4, 1932 |
| 1,881,083 | Kiep | Oct. 4, 1932 |
| 1,910,696 | Kiep | May 23, 1933 |
| 2,179,519 | Popper | Nov. 14, 1939 |
| 2,280,042 | Duffield | Apr. 14, 1942 |
| 2,508,442 | Becker | May 23, 1950 |
| 2,628,509 | Piqué | Feb. 17, 1953 |